Aug. 12, 1941.  W. H. GULESIAN  2,252,074
INDICATOR
Filed May 17, 1939  2 Sheets-Sheet 1
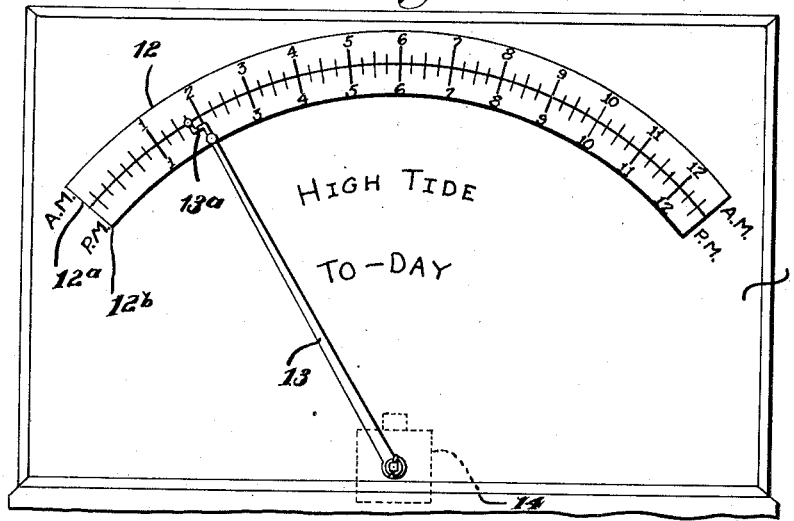
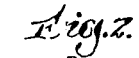
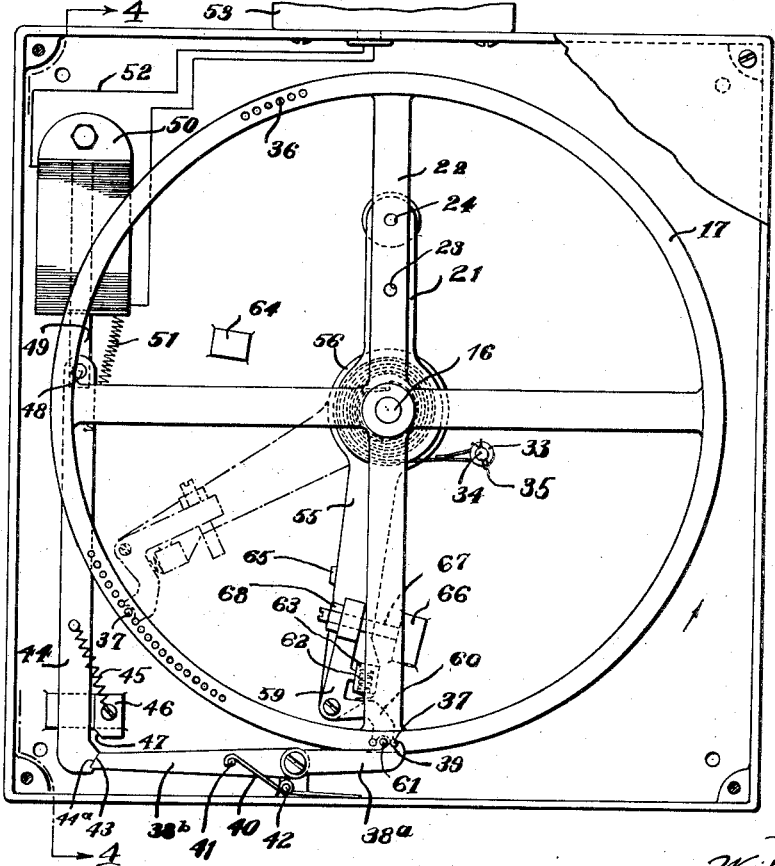

Aug. 12, 1941.   W. H. GULESIAN   2,252,074
INDICATOR
Filed May 17, 1939   2 Sheets-Sheet 2
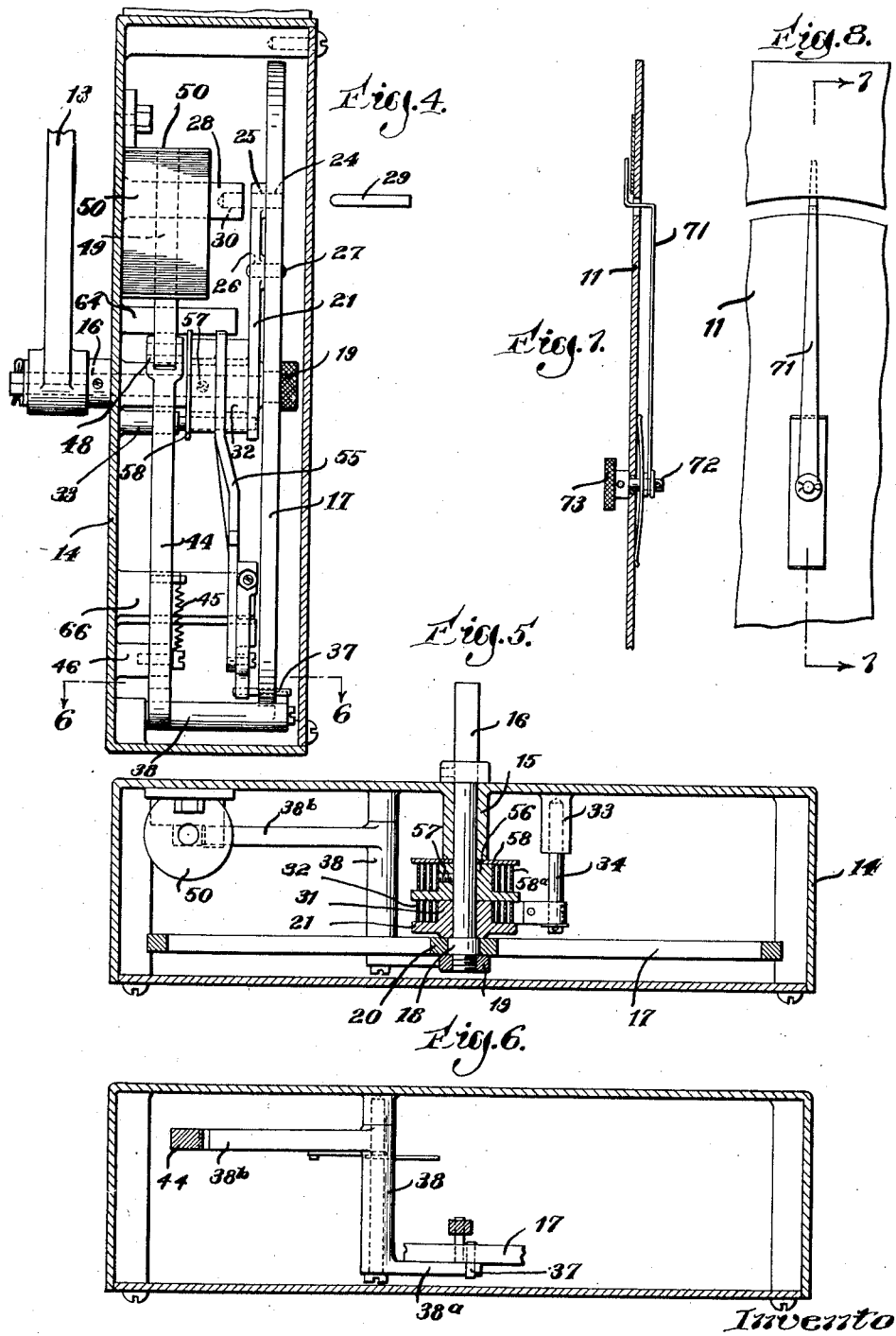

Patented Aug. 12, 1941

2,252,074

UNITED STATES PATENT OFFICE 2,252,074

INDICATOR

Willis H. Gulesian, Watertown, Mass.

Application May 17, 1939, Serial No. 274,117

15 Claims. (Cl. 58—3)

This invention relates to an improved indicator mechanism and an indicating mechanism for effecting a series of interrupted readings.

The principal object of the invention is an improved indicator mechanism. Another object is an improved tide indicator. Among other objects there may be cited means to provide daily tide indications either by manual or automatic adjustment; to combine this mechanism with advertising media such as bulletin boards and the like; and generally to make available a simple, cheap and efficient indicator mechanism of novel range of adaptability.

The invention comprises means for registering an indicator hand with a chart to present a series of interrupted readings.

In the drawings attached hereto:

Figure 1 is a view in front elevation, indicating a support and illustrating a time chart in association therewith;

Fig. 2 is a detail view in side elevation illustrating the indicator arm and its association with the supporting member.

Fig. 3 is a view in rear elevation of a container for receiving my improved indicator mechanism with the cover portion of the container partly broken away.

Fig. 4 is a vertical cross section taken on the line 4—4 of Fig. 3.

Fig. 5 is a symmetrical plan view and partial cross section taken centrally of the container.

Fig. 6 is a plan cross section taken on the line 6—6 of Fig. 4.

Fig. 7 is a vertical cross section of a manually operated modification of indicator arm taken on line 7—7 of Fig. 8; and Fig. 8 is a fragmentary front elevation of the arm.

Referring to the drawings, arrow 10 indicates generally some convenient form of base or supporting medium as for instance a sign, bulletin board, or other advertising supporting means with which my improved indicator mechanism may be associated.

In a similar manner, for example, as outside temperature indicators are presented to the attention of the general public, it may be desirable to make available tide readings, as for instance the hour at which high tide or low tide may occur, in connection with yachting, swimming, fishing and other sports. The indicator mechanism may also be employed with series of readings of other types which are of a predetermined nature.

Considerable difficulty is present in effecting clock readings which will set forth daily tide conditions since the hours at which high tide and low tide will occur are constantly changing, and the intervals of time occurring between changes are entirely non-uniform.

As an example of one means of setting forth time readings, in Fig. 1, I have illustrated the base 10 which may comprise, for example, a bulletin board, on the front face 11 of which is located a time chart 12 and the indicator arm 13. The arm 13 is associated with actuating mechanism which repeatedly moves the arm through a predetermined series of interrupted non-uniformly spaced readings on said chart, and thereby allows for the automatic presentation of daily tide conditions for a definite period of time.

In Fig. 1 I have illustrated the time chart constructed with an arcuate shape and marked off in hourly divisions, each division being sub-divided into 15-minute periods. It will be observed that the chart presents a double set of readings, one directly above the other, with the uppermost set of values having been indicated as a. m. or morning readings, and the lower set of divisions having been marked p. m. or night readings, and being represented respectively by the numerals 12a and 12b. The purpose of such a double set of readings is to allow for two readings to be observed at any given time, and the double indication is made possible by the particular cycle of change in tide movements, in which connection attention is directed to the fact that the tide reaches a high point twice in every 24 hours; and that the second high point is chronologically later than the first high point in a degree which can be substantially represented by a definite time period, that is, if the tide is high at 6:00 o'clock a. m., it will be high again at approximately 6:30 p. m. This variance may be greater or smaller, but may be readily approximated for most localities.

In view of this relation between any two high tide points during the 24-hour period, I have provided indicator arm 13 with a bent portion 13a so formed that at its point of bending a reading is effected on the lower, or p. m., section 12b; while at the same time the tip effects an earlier reading for the a. m. section 12a, thereby making quickly available the two approximate times at which high tide will occur in a given 24-hour period.

It may be desired to utilize the arm and double reading effect obtained in a hand-manipulated card, billboard, etc., in which case readings are set daily. However, means have been provided for automatically registering the indicator with the double scale, which means may also be used with a single scale or other types of readings, and which may be operative for some predetermined length of time as for example a month.

Figs. 3, 4, 5, and 6 illustrate mechanism for effecting such automatic movement of the indicator hand 13. This mechanism may be utilized with other types of indicating arms or other elements for effecting a reading, but for purposes of illustration of the actuating mechanism, the arm 13 is shown.

The mechanism may be received in some suitable housing or container such as 14 which may be secured at the back side of a bulletin board or other surface with which the above referred to chart and reading matter are associated.

The container 14 may be formed with a bearing portion 15 through which is rotatably mounted a shaft 16 extending into the container 14 and through the base 11. Shaft 16 carries indicator 13 fixed to it. At one end of shaft 16 is pivotally mounted a wheel 17 on a bearing portion 18 and screwed on the extremity of shaft 16 is an adjustment nut 19 received against the hub 20 of wheel 17. Adjacent the opposite side of wheel 17 on shaft 16 is rotatably mounted a locking lever 21 extending part way out to the periphery of wheel 17. Through one of radial arms 22 of the wheel 17 has been provided annular openings 23 and 24 and similarly openings 25 and 26 have been provided in lever 21.

Openings 23 and 26 of radial arm and lever respectively are adapted to receive a locking pin 27 and solidly lock these two members together relative to rotation on shaft 16. 28 indicates a stop which may form a part of the inner side of the container casting and which extends outwardly toward the wheel 17 with its extremity annularly recessed at 30. Preferably it will be in a position such as that shown in Fig. 4 to present the opening 30 in substantial alignment with openings 24 and 25 of the wheel and lever respectively, for the purpose of receiving a second locking pin member 29. Pin 29 is adapted to be passed all the way through opening 24 and engage in openings 25 and 30 to maintain the lever 21 in fixed position with stop 28 when so desired.

The hub portion of lever 21 engaged around shaft 16 is further formed with an inwardly extending flange 31 about which is secured spring 32 having one extremity associated with a stop 33 on the inner wall of container 14, being adjustably secured to a pin 34 by a cotter pin 35 in pin 34 as shown in Fig. 3. The lever 21 is maintained under tension by spring 32 and being pinned to wheel 17, tends to set up counterclockwise rotation of the wheel 17 as viewed in Fig. 3. The spring 32 has one end fixed to the pin 34 and is coiled around the lever 21 to provide the desired tension.

At the rim of wheel 17 have been formed openings 36 adapted to receive stop pins 37. Pivotally secured in the bottom of container 14 at the inner side thereof is a lever 38 formed with a forwardly extending arm portion 38a and a rearwardly extending arm portion 38b, as viewed in Fig. 6. The extremity of arm 38a is formed with a cutout face 39 positioned so that it may engage with one of the pins 37, located in the wheel 17, when the wheel is in a position such as illustrated in Fig. 3. The cutout face 39 is held under tension against a pin 37 by means of a spring 40 secured to the lever at points 41 and to a support carrying lever 38 at point 42. The rearwardly extending portion 38b of lever 38 has its extremity provided with a beveled face 43, and this beveled face 43 is adapted to be engaged by a link 44 having a similarly inwardly recessed face 44a.

Attached to link 44 is a spring 45 having its opposite end secured to a stop 46. The stop 46 is constructed with a beveled face 47 for normally receiving the head of link 44 thereagainst. The upper end of link 44 is pivotally pinned at 48 to a core 49 forming a part of a solenoid 50 of a conventional design and mounted in the upper part of the container 14. Attached at some convenient point, as on the solenoid, is a coil spring 51, whose lower end is secured to link 44.

The spring 51 is of such strength that when the solenoid is energized by means of an electric circuit 52 and the time switch 53, diagrammatically indicated in Fig. 3, the solenoid's action may overcome the action of spring 51 and depress link 44. The link 44 is pulled down away from the stop 46 an amount sufficient to trip by the inner end of lever 38b and take a position corresponding to that shown in Fig. 3. At some predetermined time during each twenty-four hour period the solenoid will be demagnetized by the time switch referred to and spring 51 then draws link 44 upward, which in turn carries lever 38 with it, rotating the latter a sufficient amount for the cutout face 39 to become disengaged from the particular pin which it is contacting. As the link body 44 is drawn upwardly by the spring 51 against the pull of spring 45, it again engages the sloping face 47 of stop 46. The sloping face causes the arm 44 to disengage from the arm 38b. Since wheel 17 is under tension, it will rotate in a counter-clockwise direction until a succeeding pin is brought into engagement with cutout face 39.

It is pointed out that the openings 36 in wheel 17 are evenly distributed along the rim and a spacing may be effected by insertion of pins in some of these holes, so that the distance occurring from one pin position to another will represent time intervals. In the present instance, each pin opening has been spaced to provide for a movement of the indicator hand 13 representative of 15-minute intervals, or as translated on the chart, one of the quarter divisions. In setting the pins 37 in the openings, the wheel will be assembled with a sufficient number of pins selectively inserted, to take care of the entire number of tide changes occurring over a predetermined length of time, as for instance a month, taking into consideration the exact number of days for the given month. The non-uniform tide variations which occur from day to day may be provided for by inserting pins in openings at different points in the wheel. For example, tide changes are found to vary from 15 minutes to 30 and 45 minutes, and to take care of this a pin may be inserted with one or two openings left blank. This will give substantially practical approximation, although if desired other units of division both in the time chart and in the spacings of the openings may be employed.

It will be observed that means have now been set forth for moving the wheel 17 in an interrupted manner in accordance with a predetermined series of values. However, there is necessary (A) means to translate movement of the wheel 17 which is rotatably mounted on shaft 16 into a corresponding clockwise rotation of shaft 16 and arm 13 which it carries; (B) means for repeatedly, and in an opposite direction, rotating the indicator arm 13 in a counter-clockwise manner from a position just before or after the 12:00 o'clock reading, shown at the right-hand side of Fig. 1, to a point just before or just after the one o'clock reading at the left-hand side of the chart, since there are a limited number of time divisions on the chart and the total number of divisions required, for example in a month, will greatly exceed the chart capacity.

In Figs. 3, 4 and 5 means suitable for effecting clockwise rotation are illustrated and comprise an arm 55 formed with a hub 56 which is fixed by means of a set screw 57 to the shaft 16 and maintained against a collar 58 supported on the shaft by the end of bearing 15. Having reference first to clockwise rotation of arm 13 as viewed in Fig. 1, the arm 55 is provided at its extremity with a dog 59 pivotally secured thereto and having an outwardly curved and notched finger 60. This finger is adapted to engage with a special elongated pin 61 which protrudes through an opening in wheel 17 and is maintained in engagement with the pin by means of a spring 62 received in block 63 on arm 55. It may be readily seen that movement of the wheel actuates the shaft 16 through the arm 55 in a clockwise direction as viewed in Fig. 1, and such rotation may be carried out as long as engagement of arm 55 is maintained with an elongated pin.

Referring to counterclockwise rotation, it is not only necessary to return the indicator in a counter-clockwise direction, as viewed in Fig. 1, after it has reached the end of the scale in that figure, but it is also required that the arm 55 be returned to a particular point on the chart for each repetition to indicate the exact time at which the next tide change occurs. Returning movement of the arm is effected by a spring 58a secured to plate 58. This spring 58a is located around the hub 56 and is adapted to urge the arm in a clockwise direction as viewed in Fig. 3, or counterclockwise in Fig. 1. However, reverse movement of the arm 55 can only occur when the dog 59 is disengaged from wheel 17 and wheel 17 is at rest. At all other times the arm 55 is fixed to the wheel and is turning with it in a clockwise direction (Fig. 1). It should be noted that in reversing the movement of arm 55, the shaft 16 is free to turn in members 31 and 20.

The exact location of the special elongated pins 61 relative to wheel 17 is predetermined. The arm 55, through the dog 59, remains engaged with one of pins 61 until the indicator has passed through its available arc when the arm becomes disengaged, reverses the indicator and engages with the next pin. Disengagement of the dog 59 from wheel 17 is effected by tripping against a stop 66, an adjustable rod 67 secured by adjustment nut 68. As rod 67 contacts stop 66, the dog 59 is pivoted back against spring 62 and is released from the pin 61. The whole dog, arm and shaft unit rotate relative to wheel 17 as illustrated in broken lines in Fig. 3 and is stopped against the next intervening elongated pin 61. This is repeated as many times as are necessary with the head 65 of arm 55 ultimately arriving at a position at or near stop 64.

It will be necessary at the end of predetermined periods to provide a new arrangement of pins in the wheel 17 and it is proposed as one means of providing a new pin arrangement to install another complete wheel in which proper disposition of pins has been effected for a desired period as a month. Assuming the device has been in operation over a month's period, for example, and that the last operating pin falls on the last day of a 30-day month, and the new period of service is desired to be installed for another 30-day month's period, then a wheel may for example be equipped in the following manner: One-half, or other desired proportional part, of the wheel will be provided with 30 divisions comprised by pins 37 located at varying intervals of from 15 to 45 minutes in the openings 36 of the wheel as determined by the tide calendar. Each division represents the progressive change in the hour at which high tide occurs after each time interval of twenty-four hours. Such a change may be one of fifteen, thirty, forty-five minutes, or longer, and each division may therefore include from one to three, or more, of the openings 36. Also elongated pins 61 will be inserted where required. The pins 61 will be required to extend through some of the openings 36 to provide projecting ends against which the dog 59 may engage whenever it has been released by contact with stop 66 from engagement with a preceding pin 61; for instance, if one high-tide reading falls on the hour 12:30 and the next high tide, according to the calendar, occurs at 1:00 o'clock, then the arm 55 must return the indicator 13 to the opposite end of the scale. This necessitates that the arm 55 must pass over that number of openings 36 which corresponds to the number of fifteen-minute intervals occurring between the 12:30 reading and the 1:00 o'clock reading as viewed in Figure 1. This number in exact figures would be forty-six openings to be counted off from the pin 61, from which the arm 55 is disengaged when it starts its return swing. In this forty-sixth opening, a new pin 61 would occur in readiness to be engaged by the dog 59 and place the indicator 13 in a position where it reads 1:00 o'clock as described. All return movement of the arm 55 is effected independently of any movement of the wheel 17. As soon as the engagement of the arm 55 with the new pin 61 is effected, the wheel and arm become locked together and the whole unit is in readiness to rotate in the opposite direction in a series of interrupted movements. It should be noted that the indicator arm may have to be returned to the beginning of the scale more than once and such a change or changes may occur at any time in the month, depending upon how fast the spacing of the scale is used up in taking the given number of tide changes.

Having now assembled the wheel with the required number of pin divisions in the proper space relation, it is necessary to install the wheel in the box in the proper position. The first operation is to remove the wheel which has been in operation during the past month. Before removing the old wheel, it must be rotated in a clockwise direction (see Fig. 3) until such time as the lever 21 which is pinned to the wheel comes into alignment with the opening in the stop 28. At this point, holding pin 29 is dropped all the way through the wheel to secure the lever in position over the stop member 28. Nut 19 is then removed and the old wheel may be lifted away from the pin just described and out of the container. The new wheel is then assembled in the container with the orificed arm engaged over the pin and stop 28, the cutout face of lever 38 is brought into engagement with the first pin of the new wheel, and the pin 29 removed. To set indicator 13 for the proper reading for the first day, arm 55 is rotated counter-clockwise, as viewed in Fig. 3 from a position of rest on stop 64 to engagement with the first elongated pin which passes through the wheel 17.

This will give a correct reading for high tide on the first day of the particular month in question. During the day, the solenoid is not engaged and its tendency to push link 44 down is not in effect, the link 44 being maintained against the stop 46 by spring 51 secured to the base of the solenoid. This condition continues until some predetermined hour change, as for instance, the operation of a time switch which may be set to close at darkness. With operation of the time switch, the solenoid becomes energized and the bulletin lighted, and this in turn pulls down link 44 against the bottom of the container, the pivoted condition of link 44 allowing the beveled face to trip by the lever 38 without changing its position.

This condition continues while the light circuit is completed. However, at some further predetermined time, as midnight, the light circuit is opened. This de-energizes the solenoid coil and the coil spring 51 pulls the link up, which trips lever 38 sufficient for it to be released from its pin and yet allow it to engage with the next succeeding pin.

If desired, a hand manipulator of tide indicating means may be effected and in Figs. 7 and 8, I have shown a base 11 with an indicator arm 71 fixed on a shaft 72 pivotally mounted in the base. At the opposite end of shaft 72 is secured a knob 73 for turning the indicator arm, by means of which a tide indication may be effected for any given day.

I may wish to modify further the apparatus indicated in the drawings by associating the actuating mechanism with a rotating indicator chart to set up movements of the chart corresponding to those now occurring with the indicator hand. In this modification the indicator would be fixed at a given point on the bulletin board with the indicator scale rotating in a vertical plane by the hand at interrupted intervals.

It should be observed that assembly of the pins on the wheel 17 will be dictated in accordance with a definite set of tide values for a desired month and it may be noted that almanacs usually indicate a correction factor to convert those values occurring for a given time at New York city (the Battery) to proper values for another locality on the Atlantic coast.

It is intended that various changes in the mechnaism shown may be resorted to in keeping with the spirit of the invention as defined by the appended claims.

Having described my invention, I claim:

1. An indicator for denoting a series of tide changes comprising in combination a dial having a tide notation and clock readings thereon arranged in an arcuate manner, an indicator hand pivotally associated with the clock readings, means for intermittently moving the indicator hand in one direction over the said dial to denote a series of readings at which successive tide changes occur, and means for moving the indicator hand from the last reading of said series over the dial in an opposite direction to a tide reading continuing the said succession of tide changes.

2. An indicator for denoting tide changes comprising in combination a dial having a tide notation and arcuately shaped scale thereon, an indicator arm rotatably associated with the said dial, means for actuating the indicator arm across the dial, means for limiting movement of the arm to daily passage from one to another of readings on the scale to denote a series of tide changes for a predetermined period, and means for reversing the movement of the indicator arm to position it at the beginning of the said scale.

3. An indicator for denoting tide changes comprising in combination a dial having a tide marking and clock readings thereon, an indicator arm associated with the dial, means for passing said indicator arm across the dial, means consisting of a plurality of stop members for arresting movement of the indicator arm, said stop members being arranged in spaced relation to arrest the indicator arm in a series of successive tide change readings on the dial.

4. An indicator mechanism for indicating tide conditions in combination with a bulletin board comprising a scale, an indicator arm associated with the scale, means for moving the indicator arm across the scale, a wheel member associated with the said moving means having mounted therein a plurality of stop members, said stop members comprising pins located through said wheel in spaced relation to effect intermittent arresting of the arm in accordance with a plurality of tide change readings for a given period of time.

5. An indicator mechanism for indicating tide changes comprising a dial having a tide notation and clock readings thereon, an indicator hand fixed on a shaft in association with the dial, lever means fixed to the shaft, a wheel member pivotally mounted on said shaft, tension means for rotating said wheel about the shaft in a clockwise direction, stop members received in the wheel, means for engaging said lever means with the stop members to rotate the indicator hand in a clockwise direction and register the indicator hand with a series of clock readings on the dial.

6. An indicator mechanism comprising a dial, an indicator hand fixed on a shaft in association with the dial, lever means fixed to the said shaft, an annular member pivotally mounted on said shaft, spring means for rotating said annular member in a clockwise direction relative to the shaft, stop members received through the annular member, means for engaging said lever with one of the stop members at one side of the annular member to effect clockwise rotation of the said indicator hand, and a link mechanism adapted to intermittently engage with said stop members at an opposite side of the annular member to present a series of readings of the indicator hand on the dial in accordance with the spacing of the stop members.

7. In combination an indicator mechanism including a housing having a dial associated therewith, an indicator hand fixed on a shaft in the housing and associated with the dial, lever means fixed to the shaft adapted to normally rotate the indicator hand in a counterclockwise direction, an annular member pivotally mounted on said shaft, means associated with the housing for rotating said annular member in a clockwise direction on the shaft, stops located in the annular member at both sides thereof, means for engaging the said lever means with one of the stops at one side of the annular member to effect clockwise rotation of the shaft and indicator hand, a locking mechanism pivotally mounted in the housing, said locking mechanism adapted to engage with one of said stops at an opposite side of the annular member and arrest clockwise movement of the indicator hand, and means for releasing said locking mechanism from one to another of said stops to present a series of readings on the dial.

8. In combination, an indicator mechanism including a housing having a dial associated therewith, a shaft, an indicator hand fixed on the shaft in the housing and associated with the dial, lever and spring means fixed to the shaft adapted to normally rotate the indicator hand in a counterclockwise direction, an annular member pivotally mounted on said shaft, means associated with the housing for rotating said annular member in a clockwise direction on the shaft, stop members mounted in the annular member at both sides thereof, means for engaging the said lever means with one of the stop members at one side of the annular member to effect clockwise rotation of the shaft and indicator hand, a locking mechanism pivotally mounted in the housing, said locking mechanism adapted to engage with said stop members at an opposite side of the annular member and arrest clockwise movement of the indicator hand, means for releasing said locking mechanism from one to another of said stop members to present a series of readings on the dial occurring in a clockwise direction across the dial, and means for disengaging the said lever means from the stop means to permit counterclockwise movement of the indicator hand into position to start a new series of readings.

9. An indicator for denoting the hours at which tide changes occur comprising an indicator arm, a dial associated with the indicator arm having a tide notation thereon, dual hourly scales located on the dial adjacent said tide notation, means for moving the indicator arm across the dial, stop means for interrupting movement of the indicator arm, said stop means being arranged in spaced relation to repeatedly register the extremity of the indicator arm with one of said scales and denote tide changes, said indicator arm being formed with an offset portion adapted to register with readings on the other of said scales and denote tide changes immediately succeeding those set forth by the extremity of the indicator arm.

10. A device for indicating the time of occurrence of tide changes comprising means for denoting clock readings including an hour scale and an indicator arm, spring means for moving the indicator arm across the said hour scale, and a clock mechanism adapted to intermittently arrest operation of the said spring means and register the indicator arm with the said hour scale to show a series of tide changes.

11. A device for indicating the occurrence of tide changes comprising means for denoting clock readings including a scale and an indicator arm, means for repeatedly moving one part of the said clock reading means with respect to the other part thereof, stop members associated with the said moving means for registering the indicator arm with the scale, said stop members being spaced apart by unit amounts corresponding to the unit amounts occurring between those readings on the scale which show successive daily tide changes.

12. A device for indicating the hours at which tide changes occur comprising means for denoting clock readings including a scale and an indicator arm, means for actuating a part of said clock reading means, a time control mechanism, said actuating means being responsive to said time control mechanism for shifting said readings as the tide changes occur.

13. An indicator for denoting a series of tide changes comprising in combination a dial having a tide notation and clock readings thereon, an indicator hand associated with the clock readings, a plurality of stop members, means responsive to the said stop members for intermittently moving the indicator hand over the dial, and said stop members having spaces between one another adapted to permit movement of the indicator hand to readings on the dial which denote hours of successive daily tide changes.

14. An indicator for denoting tide changes comprising in combination a dial having a tide notation and clock readings thereon, an indicator arm rotatably associated with said dial, means for rotating said indicator arm, said rotating means including a rotatable wheel, pin members mounted at the inner side of the wheel and an auxiliary arm engaged with one of said pin members, said auxiliary arm being attached to the indicator arm, a plurality of stop members mounted in the outer side of said wheel, lever means resiliently engaged with one of said stop members, electrically controlled plunger means for releasing the lever means from the said engaged stop member, and spring means for engaging the lever with another one of the stop members.

15. An indicator for denoting a series of readings comprising in combination a dial having readings thereon, an indicator arm associated with the dial, means for actuating the indicator arm, said actuating means comprising a rotatable annulus having openings spaced apart by unit measurements corresponding to unit measurements occurring between the readings on the dial, stop members mounted in some of said openings, those openings containing stop members being at non-uniformly spaced distances apart, means for arresting the actuating means, said arresting means including a lever adapted to resiliently engage said stop members, and means for repeatedly releasing said lever from the stop members to provide passage of the indicator arm from one to another of a series of successive, non-uniformly spaced apart readings on the said dial.

WILLIS H. GULESIAN.